United States Patent [19]

Sakai et al.

[11] Patent Number: 5,280,054
[45] Date of Patent: Jan. 18, 1994

[54] COATING COMPOSITION FOR USE IN HYDROPHILIC TREATMENT COMPRISING AN ORGANIC-INORGANIC COMPOSITE REACTION PRODUCT

[75] Inventors: Shigeo Sakai; Naokazu Takeuchi; Tatsuyuki Kinoshita, all of Nagoya; Masateru Hayashi, Aichi; Hiroshi Inoue; Hiromi Harakawa, both of Hiratsuka, all of Japan

[73] Assignee: Mitsubishi Jukogyo Kabushiki Kaisha, Tokyo, Japan

[21] Appl. No.: 933,180

[22] Filed: Aug. 21, 1992

[30] Foreign Application Priority Data

Aug. 22, 1991 [JP] Japan .................... 3-235564
Jul. 19, 1992 [JP] Japan .................... 4-217493
Jul. 24, 1992 [JP] Japan .................... 4.217494

[51] Int. Cl.$^5$ .................... C08K 3/34; C08L 67/00
[52] U.S. Cl. .................... 523/521; 523/500; 524/493
[58] Field of Search ............. 523/500, 521; 524/493

[56] References Cited

U.S. PATENT DOCUMENTS

| | | | |
|---|---|---|---|
| 4,442,240 | 4/1984 | Suh | 523/116 |
| 4,725,472 | 2/1988 | Okabe et al. | 428/141 |
| 4,781,490 | 11/1988 | Denton, Jr. | 427/2 |
| 4,810,759 | 5/1989 | Ryntz | 525/440 |
| 4,865,706 | 9/1989 | Karger et al. | 204/182.8 |
| 4,923,930 | 5/1990 | Iwasawa et al. | 525/168 |

FOREIGN PATENT DOCUMENTS 1456865 12/1973 United Kingdom .

*Primary Examiner*—Paul R. Michl
*Assistant Examiner*—U. K. Rajguru
*Attorney, Agent, or Firm*—Cushman, Darby & Cushman

[57] ABSTRACT

A coating composition for use in a hydrophilic treatment comprising (A) an organic-inorganic composite reaction product prepared by a process which comprises reacting 100 parts by weight, as the solid content, of (i) a water-dispersible silica with 0.1 to 10 parts by weight of (ii) a polymerizable vinylsilane monomer containing hydrolyzable alkoxysilane group to form an aqueous polymerizable vinyl group-containing silica dispersion and then reacting the aqueous polymerizable vinyl group-containing silica dispersion with (iii) a mixture of polymerizable unsaturated monomers other than the above (ii); (B) a curing agent and (C) a hydroxyl group-containing polyester resin, the ratio of the component (A) to the component (B) being in the range of 99 to 50:1 to 50 as the solid content weight ratio, and the amount of the component (C) being in the range of 5 to 60% by weight based on the solid content in the composition comprising the component (A), (B) and (C); a hydrophilic-treating method; and hydrophilically treated heat exchanger fins.

17 Claims, No Drawings

COATING COMPOSITION FOR USE IN HYDROPHILIC TREATMENT COMPRISING AN ORGANIC-INORGANIC COMPOSITE REACTION PRODUCT

BACKGROUND OF THE INVENTION (1) Field of the Invention

The present invention relates to a coating composition for use in hydrophilic treatment, a hydrophilic-treating method and hydrophilically treated heat exchanger fins.

(2) Description of the Prior Art

The condensate developed during air-cooling by the air conditioning equipment forms water drops, which then form water bridges between the heat exchanger fins to narrow the pathway of the air to flow through between the heat exchanger fins, resulting in increasing a airing resistance to produce problems such as loss of electric power, generation of noises, scattering of water drops, and the like. As a means to prevent such phenomena, it has been practiced to impart hydrophilic properties on the surface of the aluminium heat exchanger fins (hereinafter may simply be referred to as fins) so as to prevent the water drops and water bridges from being formed.

The method of effecting the hydrophilic treatment on the surface of the heat exchanger fins may include the following two methods, that is, ① the so-called after-coat method which comprises subjecting an aluminium plate to fabrication to form fins, followed by assembling the fins, and coating a surface treating agent onto the surface of the fins by the coating means such as dip coating, spray coating, shower coating and the like; and ② the so-called pre-coat method which comprises coating a surface treating agent onto an aluminium plate by a roll coater or the like beforehand to form a surface treated film, followed by subjecting the surface treated aluminium plate to press molding and fabrication to form fins.

Examples of the method, which has practically been used according to the method of imparting hydrophilic properties on the surface of the fins, as in the above method ①, may include (1) a method of coating a water-glass represented by the general formula: $mSiO_2/nNa_2O$ (see, for example, Japanese Patent Application Laid-Open No. 13078/84); (2) a method of coating a solution containing, as a major component, an organic polymer resin such as water-soluble polyamide resin to form a resin film (see, for example, Japanese Patent Application Laid-Open No. 250495/86); and the like. Although the above methods have practically been used, the above methods are not satisfactory, but still has problems to be improved in durability of hydrophilic properties such as contact angle of water drops and overall water wetting properties for the treated plate, corrosion resistance, smell, press molding properties, and in stability of the treating solution. For example, in case of the method of using the water-glass in the above method (1) showing such a good hydrophilic durability that the contact to the water drop is 20° or less, the resulting fins thus treated as above have such problems that the surface of the treating film shows powdery appearance with time, that the resulting powdery material is scattered during passage of air to develop cement smell or chemical smell, and that the water-glass is hydrolyzed by the condensate developed during the operation of the heat exchanger and the surface of the fins is alkalized, resulting in that pitting corrosion is likely to take place and in that the white powder of aluminium hydroxide as the corrosion product is scattered to produce a problem from the standpoint of environmental conservation.

Advancements in miniaturization and weight-saving have recently been made for the air conditioning equipment, and the heat exchanger, too, is of a compact design, resulting in that the space between fins is reduced, that higher hydrophilic properties are demanded, and that it is essential for the contact angle to water to be 30° or less.

Further, since the comfortable housing space has recently been demanded, development of smell from the air conditioning equipment is becoming a problem to be solved. Japanese Patent Application Laid-Open Nos. 10051/83 and 168675/86 propose the use of a treating agent containing fungiproofing agent and mildewproofing agent as a measure against a coated film smell at the beginning of using the air conditioning equipment, an unpleasant smell developed within the air conditioning equipment due to microorganisms at the start of the operation, etc. with such unsatisfactory results that further improvements are demanded.

As above mentioned, the methods being practically used at present can not satisfactorily meet the above demands, and developments of a coating composition for use in hydrophilic treatment, a method of hydrophilic treatment and hydrophilically treated heat exchanger fins which are capable of providing improved hydrophilic properties and corrosion resistance and do not produce the problem of developing smell so as to meet the above demands.

SUMMARY OF THE INVENTION

It is an object of the present invention to provide a coating composition for use in hydrophilic treatment which is capable of forming a film having improved durability of hydrophilic properties, producing little or no water-eluted material therefrom and having improved mildewproofing properties.

It is another object of the present invention to provide a hydrophilic-treating method which capable of forming the above film on the surface of the heat exchanger fins by use of the above coating composition.

It is another object of the present invention to provide a hydrophilically treated heat exchanger fins having improved hydrophilic properties, corrosion resistance and mildewproofing properties, and capable of controlling development of unpleasant smell.

That is, the present invention provides a coating composition for use in a hydrophilic treatment comprising (A) an organic-inorganic composite reaction product prepared by a process which comprises reacting 100 parts by weight, as the solid content, of (i) a water-dispersible silica with 0.1 to 10 parts by weight of (ii) a polymerizable vinylsilane monomer containing hydrolyzable alkoxysilane group to form an aqueous polymerizable vinyl group-containing silica dispersion and then reacting the aqueous polymerizable vinyl group-containing silica dispersion with (iii) a mixture of polymerizable unsaturated monomers other than the above (ii); (B) a curing agent and (C) a hydroxyl group-containing polyester resin; a treating method of making heat exchanger fins hydrophilic which comprises coating a water dispersion or aqueous solution of the above coating composition at a solid content concentration of 2 to 30% by weight onto the surface of aluminium heat exchanger fins, preferably by dip coating, followed by heating and drying; and an aluminium heat exchanger fins hydrophilically treated by the above treating method, said organic-inorganic composite reaction product having such a structure that the mixture of the polymerizable unsaturated monomers is reacted with the aqueous polymerizable vinyl group-containing silica dispersion so as to form a shell around fine inorganic silica powder as a core.

DETAILED DESCRIPTION OF THE INVENTION

The water-dispersible silica (i) used in the component (A) of the coating composition for use in the hydrophilic treatment in the present invention may be the so-called colloidal silica and has a particle size of about 3 to 500 m$\mu$, preferably about 5 to 100 m$\mu$, and as the water-dispersible silica (i), the commercially available water dispersion may usually be used as it is.

The vinylsilane monomer (ii) used in the above component (A) may include ones represented by the general formulas (I) and (II):

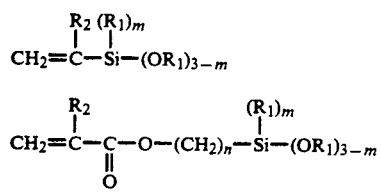

where $R_1$ represents alkyl group or alkoxyalkyl group having 1 to 10 carbon atoms, $R_2$ represents hydrogen atom or methyl group, m represents an integer of 0 or 1, and n represents an integer of 1 to 8. Examples thereof may include vinyltrimethoxysilane, vinyltriethoxysilane, vinyldimethoxymethylsilane, $\gamma$-(meth)acryloxyethyltrimethoxysilane, $\gamma$-(meth)acryloxyethyltriethoxysilane, $\gamma$-(meth)acryloxyethyldimethoxymethylsilane, $\gamma$-(meth)acryloxypropyltrimethoxysilane, $\gamma$-(meth)acryloxypropyltriethoxysilane, and the like. Of these, $\gamma$-(meth)acryloxypropyltrimethoxysilane is particularly preferred.

The above water-dispersible silica (i) is reacted with the vinylsilane monomer (ii) in an amount of 0.1 to 10 parts by weight, preferably 0.2 to 7 parts by weight of the vinylsilane monomer (ii) per 100 parts by weight, as the solid content, of the water-dispersible silica to obtain an aqueous polymerizable vinyl group-containing silica dispersion.

When the amount of the vinylsilane monomer is less than 0.1 part by weight, an amount of the polymerizable vinyl group contained in the resulting aqueous silica dispersion becomes insufficient, and on the other hand, when more than 10 parts by weight, thickening and gelation undesirably take place during the reaction between the water-dispersible silica and the vinylsilane monomer.

The reaction between the water-dispersible silica and the vinylsilane monomer may be performed by continuously heating a mixture thereof, for example, at a temperature in the range of 40° C. to boiling point, usually 100° to 110° C. with agitation for 2 to 8 hours. The aqueous polymerizable vinyl group-containing silica dispersion thus obtained is reacted with (iii) a mixture of polymerizable unsaturated monomers to obtain an organic-inorganic composite reaction product as the component (A).

The mixture (iii) of polymerizable unsaturated monomers used in the synthesis of the component (A) is a mixture of monomers containing at least one of a monomer containing a functional group selected from a group consisting of amido group, hydroxyl group and carboxyl group in the molecule and is reacted with the aqueous polymerizable vinyl group-containing silica dispersion to constitute a shell around the fine inorganic silica powder from the aqueous silica dispersion, as a core.

The above functional group-containing monomer among the polymerizable unsaturated monomers may include (a) an unsaturated amido monomer, (b) a hydroxyl group-containing unsaturated monomer and (c) a carboxyl group-containing unsaturated monomer. If needed, the polymerizable unsaturated monomers may include (d) a polymerizable unsaturated monomer other than the above (a) to (c) in addition to the above (a) to (c).

The above monomer (a) may include ones represented by the general formula (III):

where $R_2$ represents hydrogen atom or methyl group, $R_3$ and $R_4$ represent hydrogen atom, alkyl group or methylol group having 1 to 6 carbon atoms respectively, provided that both of $R_3$ and $R_4$ are hydrogen atom, or at least one of both $R_3$ and $R_4$ is methylol group. Typical examples thereof may include acrylamide, methacrylamide, N-methylolacrylamide, N-methylolmethacrylamide, and the like.

The above monomer (b) may include ones represented by the following general formulas (IV), (V) and (VI):

where $R_2$ represents hydrogen atom or methyl group, and n represents an integer of 1 to 4;

where $R_2$ represents hydrogen atom or methyl group, and n represents an integer of 2 to 100.

Typical examples of the monomer represented by the general formula (IV) may include 2-hydroxyethyl acrylate, 2-hydroxyethyl methacrylate, 3-hydroxypropyl acrylate, 3-hydroxypropyl methacrylate, 2-hydroxypropyl acrylate, 4-hydroxybutyl acrylate, and the like. These monomers may be used alone or in combination.

Typical examples of the above monomers represented by the general formulas (V) and (VI) may include polyethylene glycol mono-acrylate, polyethylene glycol mono-methacrylate, polyethylene glycol mono-allyl ether and the like, n being 2 to 100, preferably 10 to 40 respectively. These monomers may be used alone or in combination.

The above monomer (c) may include acrylic acid, methacrylic acid and the like.

The polymerizable unsaturated monomers used in the synthesis of the component (A) may be restricted by the monomers (a), (b) and (c), but, if needed, a polymerizable unsaturated monomer (d) other than the monomers (a), (b) and (c) may be used in combination therewith.

Typical examples of the polymerizable unsaturated monomer (d) may include acrylic unsaturated monomers, for example, $C_1$-$C_{18}$ alkyl esters of (meth)acrylic acid such as methyl acrylate, ethyl acrylate, propyl acrylate, isopropyl acrylate, butyl acrylate, hexyl acrylate, 2-ethylhexyl acrylate, octyl acrylate, lauryl acrylate, methyl methacrylate, ethyl methacrylate, propyl methacrylate, isopropyl methacrylate, butyl methacrylate, hexyl methacrylate, 2-ethylhexyl methacrylate, octyl methacrylate, lauryl methacrylate and the like; glycidyl acrylate, glycidyl methacrylate; $C_2$-$C_{18}$ alkoxyalkyl esters of (meth)acrylic acid such as methoxybutyl acrylate, methoxybutyl methacrylate, methoxyethyl acrylate, methoxyethyl methacrylate, ethoxybutyl acrylate, ethoxybutyl acrylate and the like; $C_2$-$C_3$ alkenyl esters of (meth)acrylic acid such as allyl acrylate, allyl methacrylate and the like; aminoalkyl esters of (meth) acrylic acid such as dimethylaminoethyl acrylate, diethylaminoethyl acrylate, dimethylaminoethyl methacrylate, diethylaminoethyl methacrylate, mono-t-butylaminoethyl methacrylate and the like; (meth) acrylamide monomers such as dimethylaminopropyl acrylamide, dimethylaminopropyl methacrylamide and the like; and the like.

Examples of the monomer (d) other than the above acrylic unsaturated monomers may include styrene, α-methylstyrene, vinyltoluene, acrylonitrile, methacrylonitrile, acrolein, methacrolein, butadiene, isoprene and the like.

The above monomer (d) may arbitrarily be incorporated depending on the performance desired.

The amounts to be used of the monomers (a) to (d) constituting the mixture (iii) of the above polymerizable unsaturated monomers (a) to (d) are not specifically limited, but normally the monomer (a) is in the range of 10 to 80% by weight, preferably 20 to 60% by weight, the monomer (b) is in the range of 10 to 60% by weight, preferably 20 to 40% by weight, the monomer (c) is in the range of 2 to 20% by weight, and the monomer (d) is in the range of 50% by weight or less, preferably 30% by weight or less respectively. When the amounts of these monomers are outside the above ranges, hydrophilic properties and curing properties of the coated film tend to be reduced.

The reaction between the aqueous polymerizable vinyl group-containing silica dispersion and the mixture (iii) of polymerizable unsaturated monomers can similarly be effected in accordance with the solution polymerization process which is a known process per se in the case where acrylic resin is prepared. More particularly, the above reaction can be effected by reacting both components at 40° to 180° C. for 4 to 10 hours in the presence of a polymerization catalyst such as azo compounds, peroxide compounds, sulfides, sulfins and the like. The ratio of the aqueous polymerizable vinyl group-containing silica dispersion to the mixture of polymerizable unsaturated monomers is not strictly limited, but normally a ratio of the former: the latter is 10:90 to 90:10, preferably 10:90 to 70:30 by the solid content weight ratio.

When the amount of the above aqueous silica dispersion is less than 10% by weight, the effect of making hydrophilic the coating composition for use in the hydrophilic treatment is unsatisfactory, and when more than 90% by weight, film-forming properties of the coating composition tends to be reduced.

The curing agent (B) to be used in combination with the organic-inorganic composite reaction product (A) thus obtained may include ones having a functional group which is capable of effecting a crosslinking reaction with the hydroxyl group in the organic-inorganic composite reaction product. Typical examples thereof may include amino resin such as melamine resin, urea resin, guanamine resin, and the like; blocked polyisocyanate compounds obtained by blocking polyisocyanates having two or more isocyanate groups with phenol, cresol, aromatic secondary amine, tertiary alcohol, lactam, oxime, etc.; organic coordinate alkoxide compounds, i.e. chelate compounds of an element selected from a group consisting of titanium, zirconium and aluminium; and the like. These curing agents may be used alone or in combination.

The ratio of the organic-inorganic composite reaction product (A) to the curing agent (B) in the present invention is not specifically limited, but (A):(B) as the solid content weight ratio is preferably in the range of 99 to 50:1 to 50, more preferably 90 to 70:10:30. When the amount of the curing agent is less than 1% by weight, crosslinking and curing of the coating composition for use in the hydrophilic treatment becomes insufficient, resulting in that the resulting coated film tends to show poor water resistance. On the other hand, when the amount of the curing agent is more than 50% by weight, there are such tendencies that water wetting properties of the resulting coated film is reduced and that the contact angle thereof to water is increased.

For the purpose of improving the water wetting properties of the resulting coated film and reducing the contact angle thereof to water, a hydroxyl group-containing polyester resin (C) is formulated into the coating composition for use in hydrophilic treatment in the present invention.

The hydroxyl group-containing polyester resin (C) is one obtained by condensation reaction of a polyhydric alcohol component comprising mono- or polyether diol having two hydroxyl groups in one molecule (hereinafter referred to as "polyether diol") and mono- or polyether polyol having three or more hydroxyl groups in one molecule (hereinafter referred to as "polyether polyol") with a polybasic acid component comprising at least one of aliphatic dibasic acid and alicyclic dibasic acid having $C_3$-$C_9$ carbon atoms respectively.

The polyether diol has one or more, preferably 1 to 200, more preferably 1 to 100 ether linkages in the molecule, and is a straight-chain compound having one of primary hydroxyl group or secondary hydroxyl group at both terminals of its molecular backbone chain respectively. The specific examples of the polyether diol may include polethylene glycol represented by the general formula (VII):

(VII)

polypropylene glycol represented by the general formula (VIII):

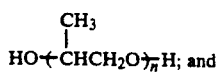  (VIII)

polyethylene-propylene glycol having the following molecular building block formulas (IX) and (X);

  (IX)

and

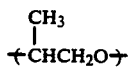  (X)

where both molecular terminal groups are HOCH$_2$CH$_2$O— or

, the formulas (IX) and (X) may repeated respectively or mutually, and a total of the formulas (IX) and (X) is n.

The above n in the general formulas (VII) and (VIII) and n as a total of the formulas (IX) and (X) are both an integer of 2 to 200, preferably 2 to 100. When n is less than 2, a coated film having improved hydrophilic properties can not be formed, and on the other hand, when more than 200, the water resistance and corrosion resistance of the coated film are undesirably reduced.

The hydroxyl group of the polyether diol is preferably a primary hydroxyl group from the standpoint of readiness of the synthesis of the hydroxyl group-containing polyester resin.

The polyether polyol has one or more, preferably 1 to 600, more preferably 3 to 300 ether linkages, and is a branched chain compound containing three or more hydroxyl groups in one molecule. When the amount of the ether linkage is less than one, a coated film having improved hydrophilic properties can not be formed, and on the other hand, when more than 600, the water resistance, corrosion resistance, etc. of the coated film are undesirably reduced.

The polyether polyol may include ones obtained by addition polymerization, for example, of trivalent or higher polyhydric alcohol as a starting material with a cyclic ether.

The trivalent or higher polyhydric alcohol may include ones having three or more hydroxyl groups polymerizable with the cyclic ether in the molecule. Specific examples thereof may include glycerin, trimethylol propane, trimethylol ethane, diglycerin, triglycerin, 1,2,6-hexane triol, pentaerythritol, dipentaerythritol, sorbitol, and the like. Of these, trimethylol propane, trimethylol ethane, glycerin and pentaerythritol are preferred. The above polyhydric alcohols may be used alone or in combination.

The cyclic ether is a compound having one ether linkage in the cyclic structure, and specific examples thereof may include ethylene oxide, propylene oxide, butylene oxide and the like. These may be used alone or in combination. Of these, ethylene oxide and propylene oxide are preferred.

Preferable examples of the polyether polyol may include an ethylene oxide or propylene oxide addition polymer of trimethylol ethane represented by the general formula (XI):

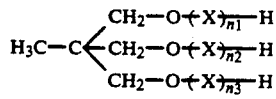  (XI)

where X is same or different, and is

+CH$_2$CH$_2$O+ or

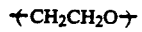;

an ethylene oxide or propylene oxide addition polymer of trimethylol propane represented by the general formula (X II):

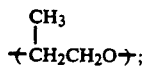  (XII)

where X is as above defined; an ethylene oxide or propylene oxide addition polymer of glycerin represented by the general formula (X III):

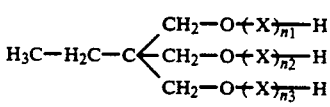  (XIII)

where X is as above defined; and an ethylene oxide or propylene oxide addition polymer of pentaerythritol represented by the general formula (X IV):

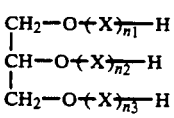  (XIV)

where X is as above defined.

The above n$_1$, n$_2$, n$_3$ and n$_4$ in the general formulas (X I) to (X IV) are an integer of 1 to 200, preferably 1 to 100 respectively. The total of n, to n$_3$ and n$_1$ to n$_4$ are in the range of 1 to 200 respectively.

On the other hand, the polybasic acid component is a saturated or unsaturated aliphatic dibasic acid or alicyclic dibasic acid having two carboxyl groups or one acid anhydrous group in one molecule respectively.

The above dibasic acid may include saturated aliphatic dibasic acids represented by the general formula (X V):

  (XV)

where n is an integer of 1 to 7, preferably 1 to 4, for example, malonic acid, succinic acid, glutaric acid, adipic acid, suberic acid, etc., and anhydrides thereof; unsaturated aliphatic dibasic acids represented by the general formula (X VI):

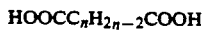  (XVI)

where n is an integer of 1 to 7, preferably 1 to 4, for example, fumaric acid and itaconic acid, and anhydrides thereof such as maleric anhydride; and alicyclic dibasic acids such as tetrahydrophthalic acid, hexahydrophthalic acid, and 3-methyltetrahydrophthalic acid and anhydrides thereof.

When n as the number of carbon atoms in the polybasic acid is more than 7, a coated film having improved hydrophilic properties can not be formed.

The hydroxyl group-containing polyester resin (C) used in the present invention may be prepared by effecting esterification reaction between the polyhydric alcohol component and the aliphatic dibasic acid or alicyclic dibasic acid.

On effecting the esterification reaction between the polyhydric alcohol component and the dibasic acid component, the ratios of both components are such that the polyhydric alcohol component is in the range of 15 to 85% by weight, preferably 20 to 75% by weight; while the dibasic acid component is in the range of 15 to 85% by weight, preferably 25 to 80% by weight. When the amount of the polyhydric alcohol component is more than 85% by weight and the amount of the dibasic acid component is less than 15% by weight, the coating composition for use in hydrophilic treatment shows poor water resistance, corrosion resistance, etc. On the other hand, when the amount of the polyhydric alcohol component is less than 15% by weight and the amount of the dibasic acid component is more than 85% by weight, the hydrophilic properties of the coating composition is undesirably reduced.

The ratio of the polyether diol to the polyether polyol in the polyhydric alcohol component is such that the polyether diol is in the range of 30 to 95% by weight, preferably 40 to 90% by weight, while the polyether polyol is in the range of 5 to 70% by weight, preferably 10 to 60% by weight. When the amount of the polyether diol is less than 30% by weight and the amount of the polyether polyol is more than 70% by weight, the preparation stability of the polyester resin is undesirably reduced. On the other hand, when the amount of polyether diol is more than 95% by weight and the amount of polyether polyol is less than 5% by weight, hydrophilic properties of the coating composition for use in hydrophilic treatment are undesirably reduced.

The polyhydric alcohol component of the hydroxyl group-containing polyester resin (C) in the present invention, if needed, may include a polyhydric alcohol other than the above polyether diol and polyether polyol.

Examples of the other polyhydric alcohol may include ethylene glycol, propylene glycol, butane diol, neopentyl glycol, butyrene glycol, pentane diol, dimethyl propane diol, hexane diol, hydrogenated bisphenol A, cyclohexane dimethanol, trimethylene glycol, tertramethylene glycol, hexamethylene glycol, trimethylol ethane, trimethylol propane, glycerin, diglycerin, dipentaerythritol, sorbitol, diethanolamine, triethanolamine, diisopropanolamine, triisopropanolamine, cyclohexyl diisopropanolamine, methyldiethanolamine, methyldiisopropanolamine, and the like.

The polybasic acid component of the hydroxyl group-containing polyester resin (C) may include, if needed, a polybasic acid other than the above aliphatic or alicyclic dibasic acid. Examples of the other polybasic acid may include an aliphatic saturated dibasic acid such as azelaic acid, sebacic acid, dodecenylsuccinic acid, anhydrides thereof, and the like; an aromatic polybasic acid such as phthalic acid, isophthalic acid, terephthalic acid, trimellitic acid, pyromellitie acid, anhydrideds thereof, and the like; an alicyclic polybasic acid such as methylcyclohexene tricarboxylic acid, tetrachlorophthalic acid, hexahydrotrimellitic acid, anhydrides thereof, and the like; and the like.

On preparing the hydroxyl group-containing polyester resin used in the present invention, an aromatic monobasic acid such as benzoic acid, p-tert-benzoic acid and the like may be incorporated depending on control of molecular weight and on coated film performance as required.

The hydroxyl group-containing polyester resin (C) may be prepared by reacting under the same conditions as in the preparation of the conventional polyester resin, for example, at 150° to 250° C. for 1 to 15 hours. Preferably, the hydroxyl group-containing polyester resin (C) has a hydroxyl value of 30 to 250, preferably 30 to 200. When the hydroxyl value is less than 30, the crosslink density of a coated film from the coating composition for use in hydrophilic treatment is reduced, resulting in making it difficult to obtain a coated film having hydrophilic properties and improved durability. On the other hand, when the hydroxyl value is more than 250, the coated film shows poor water resistance.

Advantageously, the hydroxyl group-containing polyester resin (C) has a mean molecular weight in the range of about 500 to 20,000, preferably about 1,000 to 15,000 from the standpoints of the durability and hydrophilic properties of the coated film. The hydroxyl group-containing polyester resin (C), if needed, may also contain carboxyl group in such an amount, for example, that the acid value is in the range of about 300 or less.

It is guessed that the hydroxyl group-containing polyester resin (C) obtained as above provides such functions that the reaction between the polyether diol component and the aliphatic or alicyclic dibasic acid component forms a straight-chain structure having ether linkage so as to improve the hydrophilic properties of the coated film, and that the reaction between the polyether polyol component and the aliphatic or alicyclic dibasic acid component forms a branched chain structure so as to improve durability in hydrophilic properties of the coated film. Moreover, the ether linkage contained in the polyester resin (C) not only impart hydrophilic properties but also is chemically stable and is not hydrolyzed, resulting in making it possible to maintain the hydrophilic properties of the coated film for a long period of time. Further, the aliphatic or alicyclic dibasic acid component used in combination with the polyether diol and polyether polyol is an aliphatic dibasic acid and alicyclic dibasic acid having a relatively small number of carbon atom respectively, and has relatively high hydrophilic properties by itself to provide a good effect on making hydrophilic the coated film.

It is necessary for the amount of the hydroxyl group-containing polyester resin (C) to be in the range of 5 to 60% by weight, preferably 10 to 40% by weight based on the amount as solid content of the composition comprising the organic-inorganic composite reaction product (A), the curing agent (B) and the hydroxyl group-containing polyester resin (C). When the amount of the hydroxyl group-containing polyester resin (C) is less than 5% by weight, the coated film shows insufficient hydrophilic properties. On the other hand, when more than 60% by weight, the resulting coated film shows poor water resistance, resulting swelling and dissolution of the coated film.

The coating composition for use in hydrophilic treatment, if needed, may contain a fungiproof agent (D) provided with the following conditions in addition to the above components (A), (B) and (C).

That is, the above conditions are such that (1) it has low toxicity and is highly safe, (2) it is stable to heat, light, acid, alkali, etc., is hardly soluble in water and has marked durability, (3) it has fungicidal properties or ability to inhibit growth of fungi at its low concentration, (4) incorporation of the fungiproof agent into the coating composition neither reduces the effect of the latter nor inhibits the safety of the coating composition, and that (5) it does not inhibit the hydrophilic properties of the coated film formed on the surface of the fins as well as corrosion resistance of the fins.

The fungiproof agent to meet the above conditions are known aliphatic or aromatic organic compounds and inorganic compounds. Typical examples thereof may include 2-(4-thiazolyl)-benzimidazole, n-(fluorodichloromethylthio)phthalimide, N-dimethyl-N'-phenol-N'-(fluorodichloromethylthio)-sulfamide, o-phenyl phenol, 10,10'-oxybisphenoxyarsin, zinc pyrithion, 2,3,5,6-tetrachloro-4-(methylsulfonyl)pyridine, 2,4,5,6-tetrachloroisophthalonitrile, diiodomethyl-p-toluylsulfone, methyl 2-benzimidazole carbamate, bis(dimethylthiocarbamoyl)disulfide, N-(trichloromethylthio)-4-cyclohexane-1,2-dicarboxyimide, barium methaborate, copper borate, zinc borate, zinc-copper-silver-zeolite, and the like. These fungiproof agents may be used alone or in combination.

The amount of the fungiproof agent (D) is in the range of 1 to 30% by weight, preferably 5 to 20% by weight based on the solid content of the composition comprising the above components (A), (B) and (C). When the above amount is more than 30% by weight, there are such tendencies that the safety and film-forming properties of the coating composition are inhibited and that hydrophilic properties of the coated film and corrosion resistance of the coated base plate are inhibited.

The coating composition for use in hydrophilic treatment in the present invention, if needed, may contain known surface active agents, anti-foaming agents, alcoholic solvents, pH adjustors such as acid or alkali, etc.

The coating composition for use in hydrophilic treatment in the present invention may also be coated onto plastic films or moldings, ceramics molded articles, concrete building structures, vessels, etc. in addition to coating onto the fins for making hydrophilic to be used as a film-forming agent for use in anti-condensation, anti-snowing and anti-icing.

The hydrophilic-treating method of the heat exchanger fins by use of the coating composition of the present invention is performed by diluting a coating composition comprising the above components (A), (B) and (C) to a concentration suitable as a hydrophilic-treating agent for aluminium heat exchanger fins, followed by coating onto the molded heat exchanger fins by the conventional coating method such as dip coating, shower coating, spray coating, roll coating and the like, and by heating and drying.

Of the above hydrophilic-treating methods, the method by dip coating is particularly preferred. The hydrophilic-treating method by the dip coating is performed by preparing an aqueous bath of the coating composition for use in hydrophilic treatment having a solid content concentration of 2 to 30% by weight, preferably 5 to 10% by weight, followed by dipping molded and assembled aluminium heat exchanger fins into the aqueous bath, taking out, and by heat-curing under suitable curing conditions, for example, at 120° to 200° C. for 10 to 30 minutes.

Application of the hydrophilic-treating method of the present invention to heat exchanger fins which have been subjected only to degreasing and washing may form a practically available coated film having hydrophilic properties. However, application of the hydrophilic-treating method to heat exchanger fins which have been subjected to sufficient degreasing treatment, followed by having been subjected to the phosphoric acid-chromate treatment or chromic acid-chromate treatment known as a surface treatment of aluminium is preferred from the standpoint of being capable of forming a hydrophilic coated film showing improved corrosion resistance.

The hydrophilic coated film thus formed has a film thickness of 0.2 to 5$\mu$, preferably 0.5 to 3$\mu$. When the film thickness is less than 0.2$\mu$, durability of hydrophilic properties may be unsatisfactory. On the other hand, when more than 5$\mu$, the heat dissipation efficiency of heat exchanger fins may be reduced.

The coating composition for use in hydrophilic treatment in the present invention is such that it contains, as a major component, the organic-inorganic composite reaction product having such a structure that the mixture of the polymerizable unsaturated monomers is reacted with the aqueous polymerizable vinyl group-containing silica dispersion so as to form a shell around a fine inorganic silica powder as a core, and further contains the curing agent and hydroxyl group-containing polyester resin incorporated thereinto, and is thereby capable of forming a coated film which shows improved durability of hydrophilic properties from the standpoints of overall water wetting properties and 20° or less of the contact angle to water, and has such good heat-curing properties as to produce little or no water-eluted material therefrom, resulting in developing extremely little smell. Thus, the heat exchanger fins hydrophilically treated by use of the coating composition of the present invention are highly improved in hydrophilic properties and corrosion resistance. Moreover, incorporation of a fungiproof agent into the coating composition provides such effects that fungiproof properties are improved maintaining the above performances and that development of smell is controlled, too.

EXAMPLE

Examples and Comparative Examples are shown hereinbelow. These are for more detailed explanation of the present invention, and the present invention is not to be limited thereto. Therein, "part" and "%" means "part by weight" and "% by weight" respectively.

Synthesis of organic-inorganic composite reaction product (A)

Synthesis Example 1

A 1l-four-necked flask equipped with a thermometer, a stirrer, a condenser and a dropping funnel was charged with a mixture of 333 parts of deionized water and 166 parts of isopropyl alcohol, followed by dropping with agitation 166 parts of "Cataloid S-20L" (trade name, marketed by Catalysts & Chemicals Industries Co., Ltd., aqueous colloidal silica dispersion, SiO$_2$ content: 20% by weight) and then 0.3 part of γ-methacryloxypropyltrimethoxysilane (marketed by Shin-Etsu Chemical Co., Ltd., trade name:KBM-503), heating to about 70° C., and keeping at that temperature for 2 hours to obtain a water dispersion of an aqueous silica dispersion, to which the following formulation was dropped for about 3-hours with sufficient agitation.

The above formulation is as follows:

| | |
|---|---|
| acrylamide | 13.4 parts |
| N-methylolacrylamide | 6.7 parts |
| 2-hydroxyethyl methacrylate | 26.8 parts |
| polyethylene glycol monomethacrylate | 20.1 parts |
| ammonium persulfate | 1.7 parts |
| deionized water | 266 parts |

After the completion of dropping, reaction was carried out at about 80° C. for about 2 hours to obtain a semiopaque water dispersion of an organic-inorganic composite reaction product, having a solid content of 10%.

Synthesis Examples 2-5

The procedures of Synthesis Example 1 were repeated except for using the formulations shown in Table 1 respectively to obtain water dispersions of organic-inorganic composite reaction products respectively. The formulations shown in Table 1 are represented by parts by weight of solid contents.

ponent/polyhydric alcohol component molar ratio of 0.85.

Synthesis Example 7

A mixture of 51.7 parts of polyethylene glycol 400 (weight average molecular weight: 400), 29.5 parts of an addition product of pentaerythritol with 20 moles of propylene oxide, 18.8 parts of adipic acid and 3 parts of xylene was reacted in the same manner as in Synthesis Example 6 to obtain a polyester resin, which had a hydroxyl value of 74, an acid value of 20 and a polybasic acid component/polyhydric alcohol component molar ratio of 0.85.

Synthesis Example 8

A mixture of 27.4 parts of polypropylene glycol 200 (weight average molecular weight: 200), 45.8 parts of an addition product of trimethylolethane with 15 moles of ethylene oxide, 268 parts of tetrahydrophthalic anhydride and 3 parts of xylene was reacted in the same manner as in Synthesis Example 6 to obtain a polyester resin, which had a hydroxyl value of 117, an acid value of 60, a polybasic acid component/polyhydric alcohol component molar ratio of 0.9.

Synthesis Example 9

A mixture of 70.2 parts of polyethylene glycol 400 (weight average molecular weight: 400), 4.2 parts of pentaerythritol, 25.6 parts of adipic acid and 3 parts of xylene was reacted in the same manner as in Synthesis

TABLE 1

| | | Synthesis Examples | | | | |
|---|---|---|---|---|---|---|
| | | 1 | 2 | 3 | 4 | 5 |
| Aqueous silica dispersion | water-dispersible silica | ①(Note 1) 33 | ① 25 | ②(Note 2) 33 | ② 25 | ① 33 |
| | vinylsilane monomer | ③(Note 3) 0.3 | ③ 0.1 | ③ 1 | ③ 1.3 | ③ 0.01 |
| Polymerizable unsaturated monomers | acrylamide | 13.4 | 15 | — | 13.4 | 13.4 |
| | methacrylamide | — | — | 13.4 | — | — |
| | N-methylol acrylamide | 6.7 | — | 6.7 | 6.7 | 6.7 |
| | N-methylol methacrylamide | — | 7.5 | — | — | — |
| | 2-hydroxyethyl methacrylate | 26.8 | 15 | 26 | 21 | 26.8 |
| | 2-hydroxyethyl acrylate | — | 15 | — | — | — |
| | Polyethylene glycol monomethacrylate (n = 10 in formula (V)) | 20.1 | — | — | — | 20.1 |
| | Polyethylene glycol monomethacrylate (n = 20 in formula (V)) | — | 22.5 | — | — | — |
| | Polyethylene glycol monomethacrylate (n = 15 in formula (V)) | — | — | 20 | 20.1 | — |
| | methacrylic acid | — | — | — | 5 | — |
| | methyl methacrylate | — | — | — | 7.5 | — |
| | ammonium persulfate | 1.7 | 1.0 | 1.5 | 1.5 | 1.7 |
| | total | 102 | 101.1 | 101.6 | 101.5 | 101.71 |

(Note 1): water-dispersible silica ①: colloidal silica, trade name "Cataloid S-20L", marketed by Catalysts & Chemicals Industries Co., Ltd., particle size: 10 to 20 mμ
(Note 2): water-dispersible silica ②: colloidal silica, trade name "Cataloid S1-80P", marketed by Catalysts & Chemicals Industries Co., Ltd., particle size: 70 to 90 mμ
(Note 3): vinylsilane monomer ③: γ-methacryloxypropyltrimethoxysilane, trade name "KBM-503", marketed by Shin-Etsu Chemical Co., Ltd., Synthesis of hydroxyl group-containing polyester resin (C)

Synthesis Example 6

A mixture of 28.8 parts of polyethylene glycol 200 (weight average molecular weight: 200), 51.1 parts by weight of an addition product of glycerin with 10 moles of ethylene oxide, 20.1 parts of maleic anhydride and 3 parts of xylene was reacted with agitation at 160° to 230° C. for about 8 hours to obtain a polyester resin. The resulting polyester resin had a hydroxyl value of 128, an acid value of 50, and a polybasic acid com- Example 6 to obtain a polyester resin for comparison.

Synthesis Example 10

A mixture of 26.7 parts of ethylene glycol, 10.4 parts of pentaerythritol, 62.9 parts of adipic acid and 3 parts of xylene was reacted under the same conditions as in Synthesis Example 6 to obtain a polyester for comparison.

EXAMPLE 1

To 500 parts of the water dispersion of the organic-inorganic composite reaction product, having a solid content of 10% as obtained in Synthesis Example 1, were added 21.4 parts of "Beckamine N" (trade name, marketed by Dainippon Ink & Chemicals, Inc., water-soluble urea resin solution) having a solid content of 70%, 25 parts of the polyester resin obtained in Synthesis Example 6 and 10 parts of 2-(4-thiazolyl)-benzimidazole with agitation, followed by diluting with water to obtain a coating composition for use in hydrophilic treatment having a solid content of 7%.

Next, an aluminium plate (A1050, thickness: 0.1 mm) was degreased with an alkali degreasing agent (marketed by The Japan C. B. Chemical Co., Ltd., trade name "Chemicleaner 561B"), followed by effecting a chromate treatment to be a coating weight of 50 mg/m² as chromium with a chromate treating agent (marketed by Nihon Parkarizing Co., Ltd., trade name "Alchrom 713"), coating the above coating composition for use in hydrophilic treatment onto the aluminium plate treated as above to be a dry film thickness of 1μ by dip coating, and by heat curing at 160° C. for 30 minutes to form a hydrophilically treated film.

The hydrophilically treated aluminum plate as above was subjected to tests of hydrophilic properties, corrosion resistance, fungiproof properties, etc. The test results are shown in Table 3.

Examples 2-7 and Comparative Examples 1-4

The procedures of Example 1 were repeated except for using the formulations shown in Table 2 to obtain coating compositions for use in hydrophilic treatment, having a solid content of 7% respectively, and hydrophilically treated film were formed in the same manner as in Example 1 respectively. The formulations in Table 2 were based on solid contents.

Hydrophilically treated aluminum plates were subjected to tests in the same manner as in Example 1, respectively. The test results are shown in Table 3.

(*1) Water wetting properties:

A test plate was dipped into tap water for 30 seconds and was taken out to evaluate the water wetting properties by a degree of a water-wetted area at the time when taken out as follows.

| ⊚: Degree of water wetted area | 100% |
|---|---|
| ○: Degree of water wetted area | 90 to 100 (exclusive) |
| Δ: Degree of water wetted area | 50 to 90 (exclusive) |
| X: Degree of water wetted area | less than 50% |

(*2) Contact angle:

A water drop was formed on a test plate by use of about 0.03 cc of deionized water, and a contact angle of the water drop at 20° C. was measured by a contact angle meter DCAA Type marketed by Kyowa Kagaku Co., Ltd. Further, tests of water wetting and contact angle were carried out for such flowing water-dipped test plates that the test plates were dipped into tap water for 500 hours, followed by taking out, and by leaving to stand for 24 hours under an environment of 20° C. and 75% R.H. in addition to initial test plates.

(*3) Corrosion resistance:

It was evaluated by a degree of an area where a white rust developed on a smooth surface after 300 hours' salt water spray test according to JIS Z 2371 as follows.

| ⊚: Degree of white rust-developed area | less than 1% |
|---|---|
| ○: Degree of white rust-developed area | 1 to 10% (exclusive) |
| Δ: Degree of white rust-developed area | 10 to 30% (exclusive) |
| X: Degree of white rust-developed area | 30% or more |

TABLE 2

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| Organic-inorganic composite reaction product | Synthesis Examples | 1 | 1 | 1 | 1 | 2 | 3 | 4 | 1 | 1 | 1 | 5 |
| | solid contents (parts) | 50 | 50 | 50 | 50 | 50 | 62.5 | 60 | 75 | 50 | 50 | 50 |
| Water-soluble urea resin (parts) (Note 4) | | 15 | 15 | 15 | | | 15 | 15 | 15 | 15 | 15 | 15 |
| Water-soluble melamine resin (parts) (Note 5) | | | | | 15 | 15 | | | | | | |
| Hydroxyl group-containing polyester resin | Synthesis Examples | 6 | 7 | 8 | 6 | 6 | 6 | 6 | | 9 | 10 | 6 |
| | solid contents (parts) | 25 | 25 | 25 | 25 | 25 | 12.5 | 25 | — | 25 | 25 | 25 |
| 2-(4-thiazolyl)-benzimidazole (parts) | | 10 | 10 | 10 | 10 | | 10 | | 10 | 10 | 10 | 10 |
| Zinc pyrithion (parts) | | | | | | 10 | | | | | | |
| Total | | 100 | 100 | 100 | 100 | 100 | 100 | 100 | 100 | 100 | 100 | 100 |

(Note 4): Water-soluble urea resin: marketed by Dainippon Ink & Chemicals, Inc., trade name "Beckamine N"
(Note 5): Water-soluble melamine resin: marketed by Mitsui Toatsu Chemials, Inc., trade name "Cymel 303"

TABLE 3

| | | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| Appearance of film | | | good | good | good | good | good | good | good | good | good | good | good |
| Hydrophilic Properties | Initial | Water wetting properties (#1) | ⊚ | ⊚ | ⊚ | ⊚ | ⊚ | ⊚ | ⊚ | Δ | Δ | Δ | Δ |
| | | Contact angle (#2) | 12 | 15 | 17 | 19 | 13 | 20 | 13 | 42 | 35 | 40 | 42 |
| | After dipping into flowing water | Water wetting properties (#1) | ⊚ | ⊚ | ⊚ | ⊚ | ⊚ | ○ | ⊚ | X | Δ | Δ | Δ |
| | | Contact angle (#2) | 17 | 19 | 21 | 24 | 15 | 27 | 17 | 60 | 43 | 45 | 49 |
| Corrosion resistance (#3) | | | ⊚ | ⊚ | ⊚ | ⊚ | ⊚ | ⊚ | ⊚ | ○ | ○ | ○ | ○ |
| Fungiproof properties (#4) | | | ○ | ○ | ○ | ○ | ○ | ○ | X | ○ | ○ | ○ | ○ |

The test methods in Table 3 were carried out as follows.

(*4) Fungiproof properties:

It was carried out according to JIS-Z-2911. A mixed spore suspension of the following test fungi was sprayed onto respective coated plates, followed by leaving at rest at 27° C. for 28 days, and by observing a degree of propagation of fungi on the coated plate. When no fungi are developed or attached, it is graded as good (◯), and when attached, it is graded poor (x).

The above test fungi are Aspergillus, Penicillum, Alternaria, and Cladosporium.

What is claimed is:

1. A coating composition for use in a hydrophilic treatment comprising (A) an organic-inorganic composite reaction product prepared by a process which comprises reacting 100 parts by weight, as the solid content, of (i) a water-dispersible silica with 0.1 to 10 parts by weight of (ii) a polymerizable vinylsilane monomer containing hydrolyzable alkoxysilane group to form an aqueous polymerizable vinyl group-containing silica dispersion and then reacting the aqueous polymerizable vinyl group-containing silica dispersion with (iii) a mixture of polymerizable unsaturated monomers other than the above (ii); (B) a curing agent and (C) a hydroxyl group-containing polyester resin.

2. A coating composition as claimed in claim 1, wherein the ratio of the component (A) to the component (B) is in the range of 99 to 50:1 to 50 as the solid content weight ratio, and the amount of the component (C) is in the range of 5 to 60% by weight based on the solid content in the composition comprising the component (A), (B) and (C).

3. A coating composition as claimed in claim 1, wherein the polymerizable vinylsilane monomer (iii) is γ-(meth)acryloxypropyltrimethoxysilane.

4. A coating composition as claimed in claim 1, wherein the mixture of polymerizable unsaturated monomers is a mixture of monomers containing at least one of monomers containing a functional group selected from a group consiating of amido group, hydroxyl group and carboxyl group in the molecule.

5. A coating composition as claimed in claim 4, wherein the monomers containing the functional group are unsaturated amido monomer, hydroxyl group-containing unsaturated monomer and carboxyl group-containing unsaturated monomer.

6. A coating composition as claimed in claim 1, wherein the ratio of the aqueous polymerizable vinyl group-containing silica dispersion to the mixture of the polymerizable unsaturated monomers is in the range of 10:90 to 90 to 10 as the solid content weight ratio.

7. A coating composition as claimed in claim 1, wherein the hydroxyl group-containing polyester resin (C) is one obtained by condensation reaction of a polyhydric alcohol component comprising mono- or polyether diol having two hydroxyl groups in one molecule (hereinafter referred to as "polyether diol") and mono- or polyether polyol having three or more hydroxyl groups in one molecule (hereinafter referred to as "polyether polyol") with a polybasic acid component comprising at least one of aliphatic dibasic acid and alicyclic dibasic acid having $C_3$-$C_9$ carbon atoms respectively.

8. A coating composition as claimed in claim 7, wherein the polyether diol has one or more ether linkages in the molecule, and is a straight-chain compound having one of primary hydroxyl group or secondary hydroxyl group at both terminals of its molecular backbone chain respectively.

9. A coating composition as claimed in claim 7, wherein the polyether polyol has one or more ether linkages, and is a branched chain compound containing three or more hydroxyl groups in one molecule.

10. A coating composition as claimed in claim 9, wherein the polyether polyol is selected from a group consisting of an addition product of trimethylol ethane with ethylene oxide or propylene oxide, an addition product of trimethylol propane with ethylene oxide or propylene oxide, an addition product of glycerin with ethylene oxide or propylene oxide, and an addition product of pentaerythritol with ethylene oxide or propylene oxide.

11. A coating composition as claimed in claim 7, wherein the ratio of the polyhydric alcohol component to the dibasic acid component is such that the polyhydric alcohol component is in the range of 15 to 85% by weight and the dibasic acid component is in the range of 15 to 85% by weight.

12. A coating composition as claimed in claim 7, wherein the ratio of the polyether diol to the polyether polyol in the polyhydric alcohol component is such that the polyether diol is in the range of 30 to 95% by weight, while the polyether polyol is in the range of 5 to 70% by weight.

13. A coating composition as claimed in claim 1, wherein the hydroxyl group-containing polyester resin has a hydroxyl value of 30 to 250.

14. A coating composition as claimed in claim 1, wherein said coating composition further contains a germiproof agent.

15. A hydrophilic-treating method which comprises coating a water dispersion or aqueous solution of the coating composition claimed in claim 1 at a solid content concentration of 2 to 30% by weight onto the surface of the aluminium heat exchanger fins.

16. A hydrophilic-treating method as claimed in claim 15, wherein said coating is carried out by dip coating.

17. Aluminium heat exchanger fins hydrophilically treated by coating the coating composition claimed in claim 1 onto the surface of the aluminium heat exchanger fins.

* * * * *

UNITED STATES PATENT AND TRADEMARK OFFICE
CERTIFICATE OF CORRECTION

PATENT NO. : 5,280,054
DATED : Jan. 18, 1994
INVENTOR(S) : Shigeo SAKAI et al.

It is certified that error appears in the above-identified patent and that said Letters Patent is hereby corrected as shown below:

ON THE TITLE PAGE:

Change the assignee to read as follows:

--[73] Assignee: Mitsubishi Jukogyo Kabushiki Kaisha, Tokyo, Japan; and, Kansai Paint Co., Ltd., Amagasaki-Shi, Japan--.

Under [30] Foreign Application Priority Data, delete "Jul. 24, 1992 [JP] Japan 4.217494".

Signed and Sealed this

Fifth Day of July, 1994

*Attest:*

BRUCE LEHMAN

*Attesting Officer*     *Commissioner of Patents and Trademarks*